May 25, 1937.　　K. F. GALLIMORE ET AL　　2,081,145

MACHINE TOOL

Filed Dec. 16, 1935　　6 Sheets-Sheet 1

Fig. 1

INVENTORS
Keith F. Gallimore
Garner H. Schurger
By Parker, Carlson, Pitzner & Hubbard
ATTORNEYS May 25, 1937.  K. F. GALLIMORE ET AL  2,081,145

MACHINE TOOL

Filed Dec. 16, 1935   6 Sheets-Sheet 2

INVENTORS
Keith F. Gallimore
Garner H. Schurger
ATTORNEYS

May 25, 1937.  K. F. GALLIMORE ET AL  2,081,145
MACHINE TOOL
Filed Dec. 16, 1935        6 Sheets-Sheet 3

INVENTORS
Keith F. Gallimore
Garner H. Schurger
By Parker, Carlson, Pitzner & Hubbard
ATTORNEYS May 25, 1937.  K. F. GALLIMORE ET AL  2,081,145
MACHINE TOOL
Filed Dec. 16, 1935  6 Sheets-Sheet 4
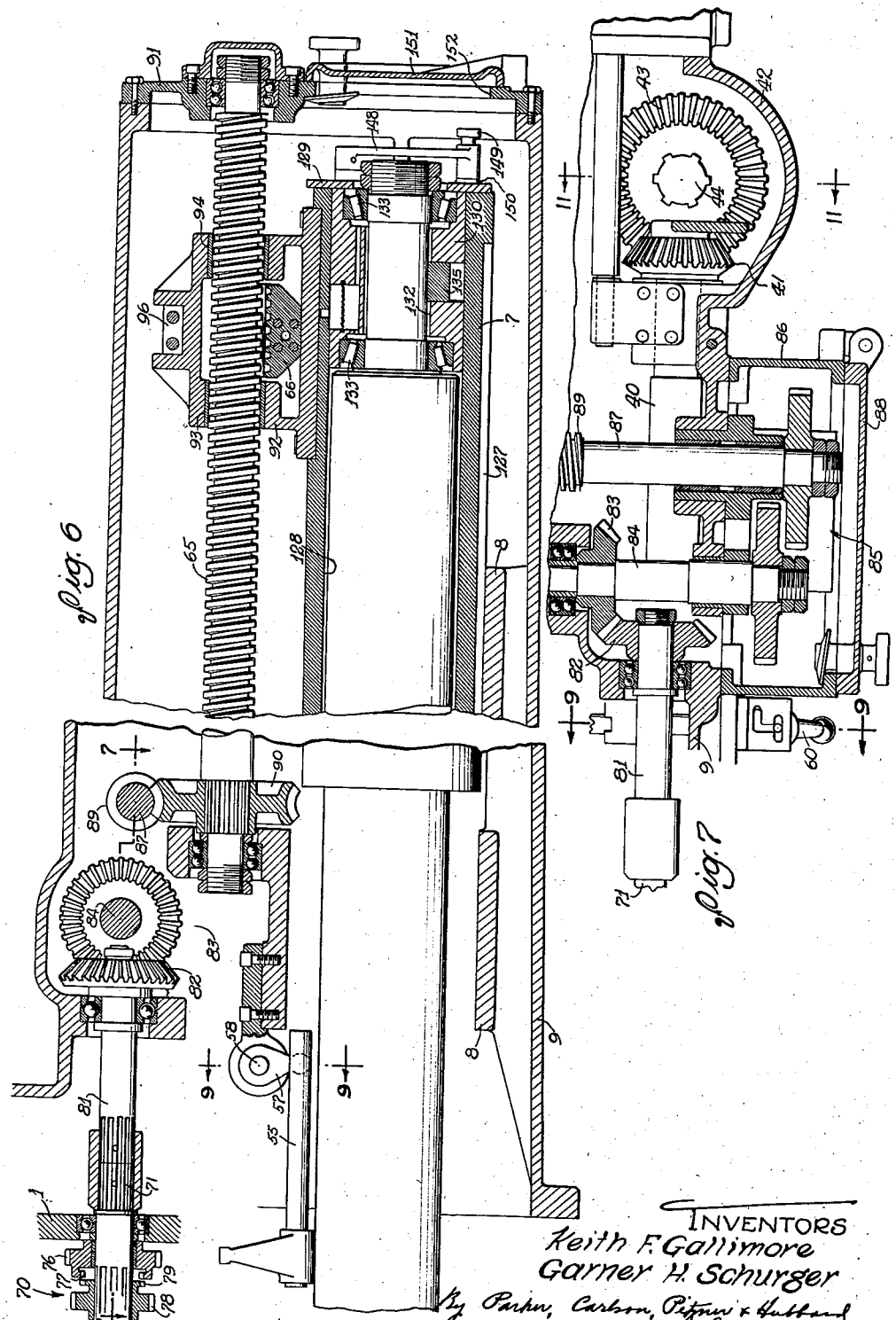

May 25, 1937.  K. F. GALLIMORE ET AL  2,081,145
MACHINE TOOL
Filed Dec. 16, 1935   6 Sheets-Sheet 5
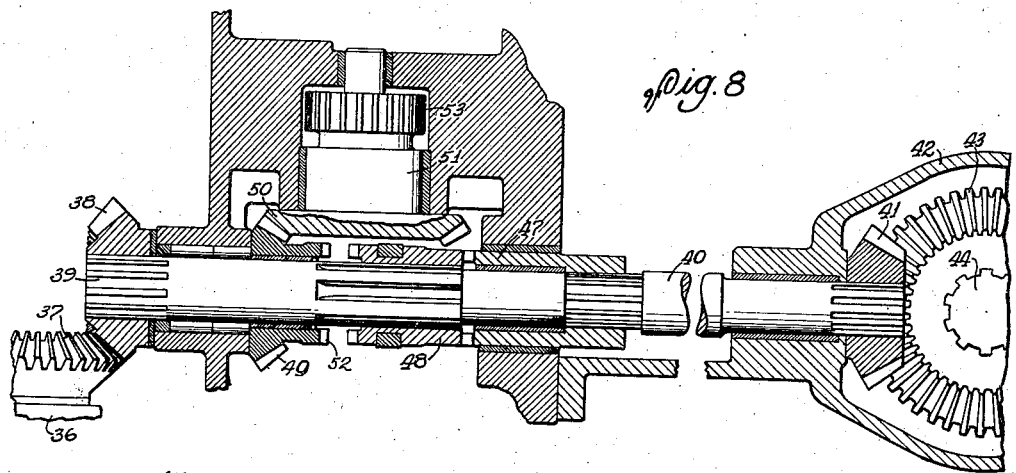
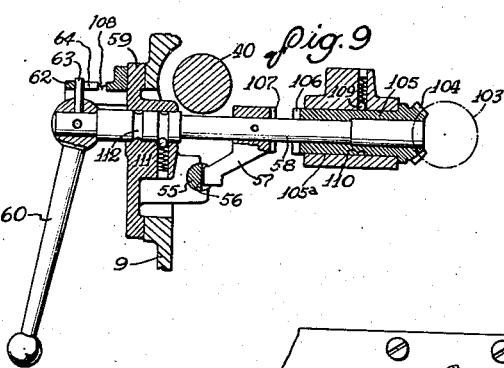
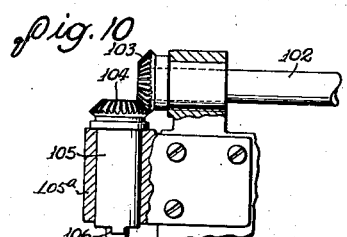
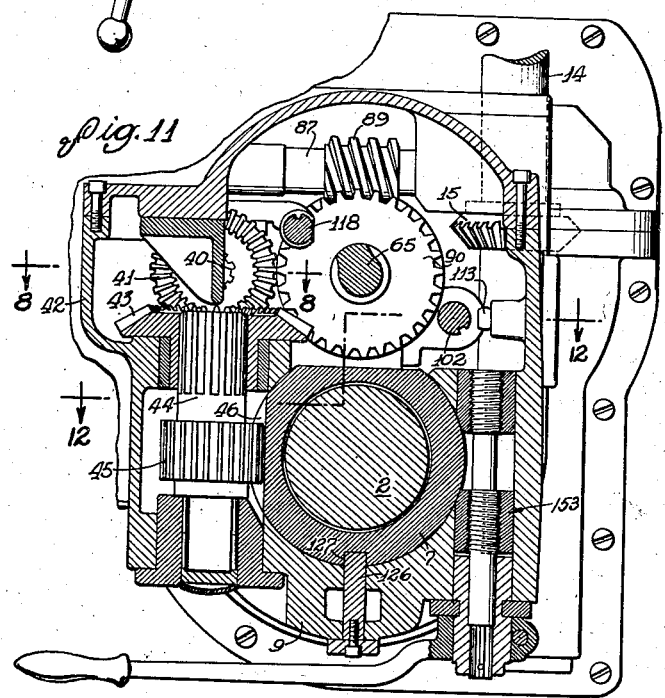
INVENTORS
Keith F. Gallimore
Garner H. Schurger
By Parker, Carlson, Pitzner & Hubbard
ATTORNEYS May 25, 1937.　　K. F. GALLIMORE ET AL　　2,081,145
MACHINE TOOL
Filed Dec. 16, 1935　　6 Sheets—Sheet 6
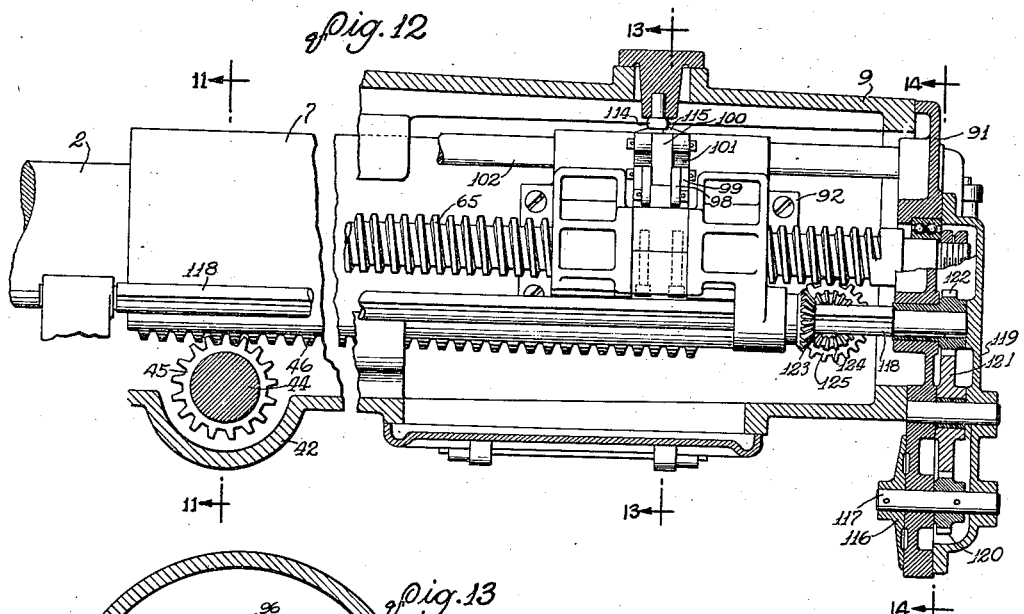
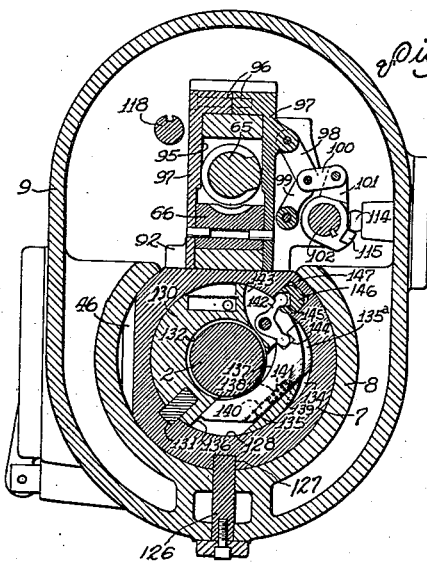
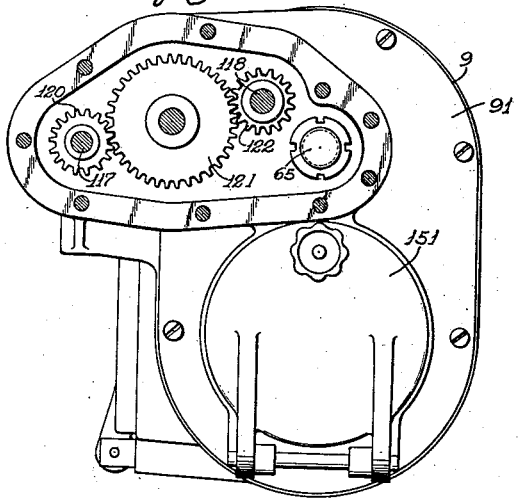
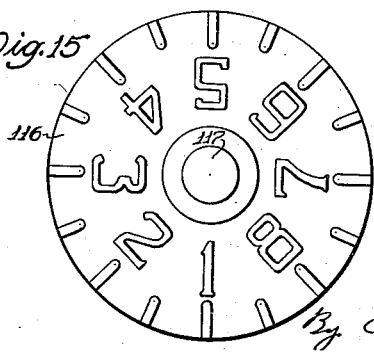
INVENTORS
Keith F. Gallimore
Garner H. Schurger
By Parker, Carlson, Pitzner & Hubbard
ATTORNEYS Patented May 25, 1937

2,081,145

UNITED STATES PATENT OFFICE 2,081,145

MACHINE TOOL

Keith F. Gallimore and Garner H. Schurger, Fond du Lac, Wis., assignors to Giddings & Lewis Machine Tool Co., Fond du Lac, Wis., a corporation of Wisconsin Application December 16, 1935, Serial No. 54,624

24 Claims. (Cl. 29—26)

The present invention relates to improvements in machine tools, and has particular reference to a new and improved spindle headstock adapted for use especially in machines commonly known as horizontal boring, drilling and milling machines.

Spindle headstocks of the foregoing character ordinarily include a rotatable and axially movable tool spindle, means for rotating the spindle at any one of a plurality of selective speeds, and power means for adjusting or feeding the spindle axially at any one of a plurality of selective speeds in timed relation to the rotation. The present invention has for certain of its objects the provision of novel axial feeding means which is not subject to substantial error by reason of excessive backlash or manufacturing inaccuracies, but is accurate and reliable in operation, which in particular is effective throughout the normal range of operation to maintain with a high degree of constancy and precision the predetermined timed relation between the rotation and the axial feed of the spindle, and which in general is simple, compact, sturdy and relatively inexpensive in construction.

Another object is to provide a headstock of the foregoing character in which the axial feed drive for the rotary spindle includes a nut and a coacting precision lead screw.

A further object resides in the provision in the headstock of two independent selectively available axial feed drives for the rotary spindle, one drive being adapted for precision work, and the other drive being adapted for numerous operations, such, for example, as milling, boring and drilling, not requiring a high degree of accuracy in the timed relation between the rotation and the axial feed of the spindle, thereby permitting use of the first mentioned drive only when required by the character of the work so as to reduce the wear of the precision parts and preserve their accuracy over a long period of time.

A further object resides in the provision of novel interlock means for preventing the simultaneous connection of both feed drives.

Other detailed objects reside in the provision of new and improved means including a half nut for connecting the precision feed drive to the spindle, means for reversing the precision feed drive in relation to the spindle rotation, means for adjusting the rate of the precision feed in relation to the spindle rotation, and/or means for indicating the axial position of the spindle.

Another object is to provide a double set spindle of novel construction.

Further objects and advantages will become apparent as the description proceeds.

In the accompanying drawings, Figure 1 is a fragmentary longitudinal vertical sectional view of a headstock embodying the features of our invention.

Fig. 6 is a fragmentary vertical sectional view of the right end of the headstock and taken substantially in the same plane as Fig. 1 and illustrating the precision feed drive.

Fig. 7 is a fragmentary horizontal sectional view taken substantially along line 7—7 of Figs. 3 and 6.

Fig. 8 is a fragmentary horizontal sectional view taken substantially along line 8—8 of Figs. 2 and 11.

Fig. 9 is a fragmentary vertical sectional view illustrating the feed interlock and taken substantially along line 9—9 of Figs. 1, 6, and 7.

Fig. 10 is a plan of the construction shown in Fig. 9.

Fig. 11 is a transverse vertical sectional view of the headstock taken substantially along line 11—11 of Figs. 7 and 12.

Fig. 12 is a horizontal sectional view taken substantially along line 12—12 of Fig. 11.

Fig. 13 is a transverse sectional view taken along line 13—13 of Fig. 12.

Fig. 14 is a transverse sectional view taken along line 14—14 of Fig. 12.

Fig. 15 is a view on an enlarged scale of a dial for indicating the axial position of the spindle.

Referring more particularly to the drawings, the invention resides in a new and improved spindle headstock of the general character disclosed in the patent to Gallimore No. 1,858,491 and adapted particularly for use in horizontal boring, drilling and milling machines.

Figure 2:
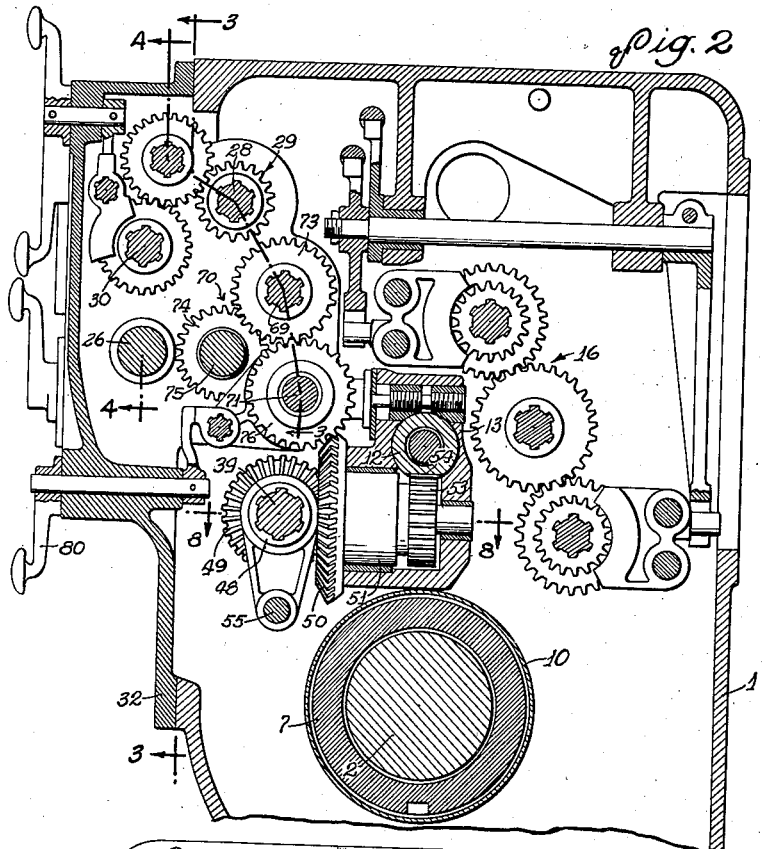
Fig. 2 is a transverse sectional view of the headstock taken substantially along line 2—2 of Fig. 1.

The headstock (see Figs. 1 and 2) comprises a closed casing 1 adapted to be mounted on a suitable support, such, for example, as a vertical column (not shown). Mounted for rotation in the casing 1 and adapted to be projected axially from one end thereof are a main spindle 2 and a relatively light parallel auxiliary spindle 3. Each of these spindles is shown with the usual tapered socket for the reception of a cutting tool (not shown).

The left end of the main spindle 2 extends through and is slidably splined in a drive sleeve 4 suitably journaled in the casing 1. Preferably, the drive sleeve 4 is journaled for rotation in a fixed axial position in anti-friction bearings 5 and 6. One end of the sleeve 4 projects to the exterior of the casing 1 and is adapted to support a suitable cutting tool (not shown). The right end of the spindle 2 extends freely into a reciprocable ram 7 in the form of an elongated cylindrical sleeve, and is rotatably connected to the latter for axial movement therewith. The ram 7 is slidably and non-rotatably supported in a plurality of longitudinally spaced bearing sleeves 8 which are axially aligned with the sleeve 4, and which are formed in an elongated guide casing 9 secured to the right end of the casing 1 and constituting a continuation thereof. An elongated cylindrical guard 10 mounted on the right end wall of the casing 1 between the bearing 6 and the adjacent bearing sleeve 8 in the casing 9 substantially encloses the inner end of the ram 7.

The auxiliary spindle 3 at its left end also extends through and is longitudinally splined for axial movement in a sleeve 11 suitably journaled in the casing 1. The other or inner end of the spindle 3 is reduced in size, and extends freely through and is journaled in an elongated guide sleeve 12 which constitutes a feed ram. The latter is slidably mounted in a fixed elongated bearing 13 in the casing 1, and in retracted position extends partially into the inner end of the casing 9.

The headstock is a self-contained unit including speed change means for rotating the spindles 2 and 3 and for feeding them axially. The power inlet comprises a vertical drive shaft 14 adapted to be connected to a suitable source of power (not shown) and extending slidably through the casing 9. A bevel gear 15 rotatably journaled in the casing 9, is axially splined to the shaft 14, and is adapted to be connected through a speed-change mechanism, providing, for example, thirty-six different speeds, to the auxiliary spindle 3. In its preferred form, the speed-change mechanism comprises a nine speed gearing 16, a two speed gearing 17 and a second two speed gearing 18 connected in series. For a more detailed understanding of the gearings 16, 17, and 18, reference may be had to the aforesaid patent.

The main spindle 2 is adapted to be driven in constant timed relation to the auxiliary spindle 3, for example, at a ratio of one to four. The connecting drive comprises a pinion 19 on the auxiliary spindle sleeve 11 meshing with a gear 20 rotatable on the main spindle sleeve 4, and adapted to be connected thereto by a spline clutch member 21.

Figure 3:
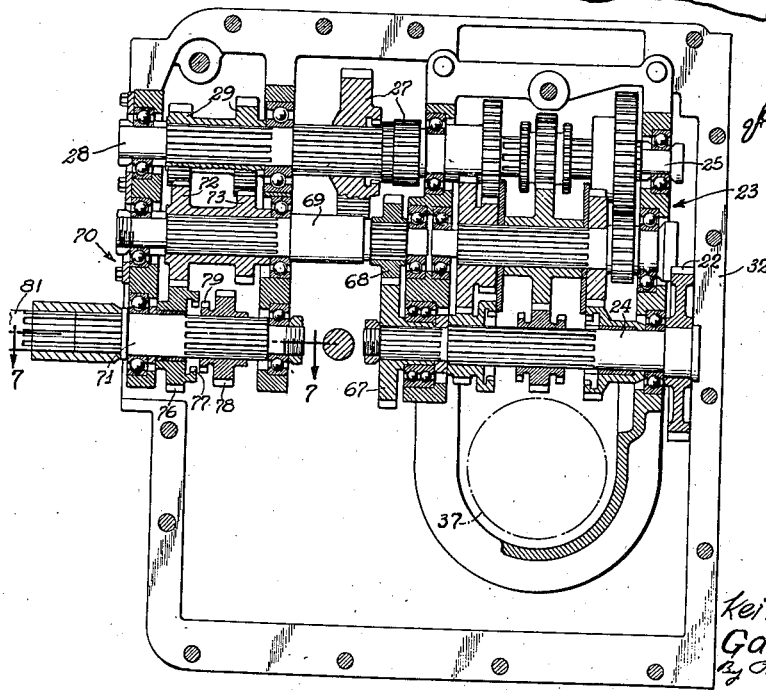
Fig. 3 is an elevational view of the inside of the headstock front cover plate, and the feed drive gearing mounted thereon.
Figure 4:
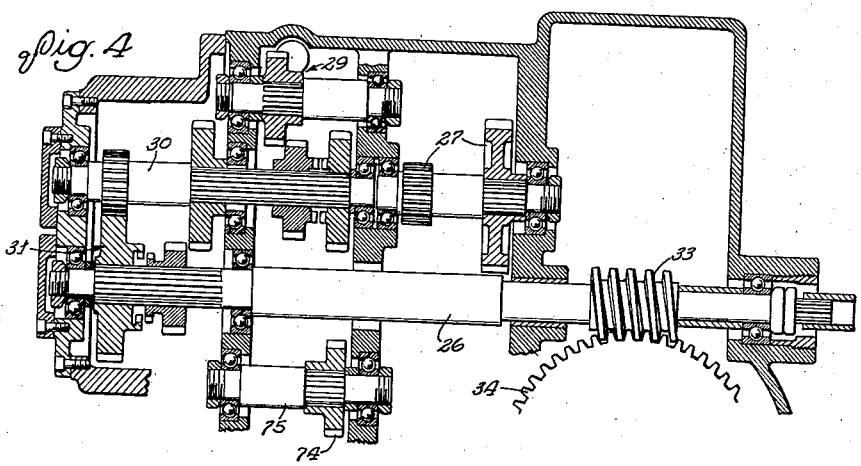
Fig. 4 is a fragmentary vertical sectional view of the gearing shown in Fig. 3 and taken substantially along line 4—4 of Fig. 2.
Figure 5:
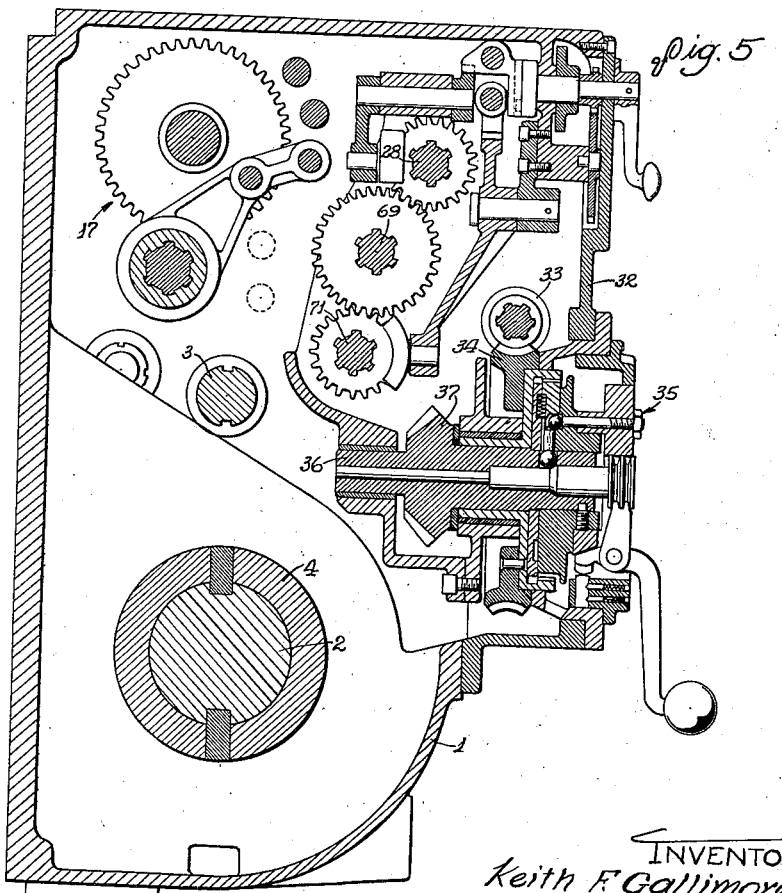
Fig. 5 is a transverse vertical sectional view of the headstock taken substantially along line 5—5 of Fig. 1.

Adjustable means is provided for feeding either of the spindles 2 and 3 axially in synchronism with the rotation. To this end, a drive pinion 21ᵃ is secured to the inner end of the spindle sleeve 11, and meshes with a power inlet gear 22 (see Fig. 3) of a gear shift feed mechanism comprising a nine feed unit 23 having inlet and outlet shafts 24 and 25. The outlet shaft 25 is connected to a worm shaft 26 (see Fig. 4) through a two speed gearing 27 terminating in a shaft 28, a reversing gearing 29 to a shaft 30, and a two speed gearing 31, connected in series to provide in the present instance thirty-six different selective rates of feed relative to the spindle rotation. The gearings 23, 27, 29, and 31 are suitably mounted on the inside of a cover plate 32 for the housing 1. Secured to the shaft 26 is a worm 33 meshing with a worm wheel 34 which is adapted to be connected through a master clutch 35 in the cover 32 to a shaft 36. A bevel gear 37 on the shaft 36 meshes with a bevel gear 38 on the horizontal shaft 39 (see Fig. 8) adapted to be connected selectively to the spindle feed rams 7 and 12.

Axially aligned and positioned end to end with the shaft 39 is a shaft 40 which extends into the casing 9 along the ram 7.

The right end of the shaft 40 is provided with a bevel gear 41 in a housing 42 on the front of the casing 9 (see Figs. 8 and 11). The gear 41 meshes with a bevel gear 43 on a vertical shaft 44. A pinion 45 on the shaft 44 meshes with a longitudinal gear rack 46 formed along the front side of the ram 7. Splined on the shaft 39 for axial movement into engagement with a clutch element 47 on the shaft 40 is a clutch sleeve 48. When the clutch sleeve 48 is in its right end position, the feed drive connection for the main spindle 1 is completed.

A bevel gear 49 freely rotatable on the shaft 39 meshes with a bevel gear 50 on a stub shaft 51, and is formed with a clutch element 52 adapted for engagement by the clutch sleeve 48. A pinion 53 (see Fig. 2) on the shaft 51 meshes with a longitudinal gear rack 54 formed along the underside of the ram 12. When the clutch sleeve 48 is in its left hand position, the rack drive for the ram 13 will be connected. When the sleeve 48 is located in intermediate or neutral position neither of the drives through the racks 46 and 54 is connected.

To provide means for shifting the clutch sleeve 48, it is connected to one end of a shifter rod 55 formed in the other end with a transverse notch 56 (see Figs. 9 and 10). A rocker arm 57 fixed on a shaft 58 engages at its free end in the notch 56. The shaft 58 extends slidably and rotatably through a bracket 59 to the front of the casing 9, and is provided at its forward end with a hand lever 60. Projecting upwardly from the hub of the lever 60 into a slot 61 in an overlying plate 62 on the bracket 59 is a guide pin 63. The slot 61 defines the end positions of the clutch sleeve 48, and has an intermediate transverse portion 64 defining the neutral position of the sleeve.

The rack and gear feed drive for the spindle 2 just described is therefore selectively available, and as shown comprises thirty-six different feed rates relative to any spindle rotation and is reversible. This drive is suited for a large number of machine operations, such as milling, drilling and boring, not requiring a closely accurate synchronism between the rotation and feed of the spindle 2. However, for certain precision work, as in thread cutting, requiring a closely accurate and uniform lead, the rack and gear drive is not entirely satisfactory, particularly for finishing work, due to manufacturing inaccuracies ordinarily present. This may be said to be due to the cumulative backlash of the relatively long train of speed-change gearing, and particularly to the difficulty in cutting the gear rack 46 with sufficient uniformity along its length to maintain an invariable lead. One of the primary features of the present invention therefore resides in the provision of a precision feed drive for the main spindle 2 parallel to and adapted for use interchangeably with the rack and gear drive.

The precision feed drive in its preferred form comprises a lead screw 65 which is connected at one end across the feed gearings 23, 27, 29, and 31 to the shaft 24, and which is adapted to be connected to a nut 66 movable with the spindle ram 7. More particularly, a gear 67 (see Fig. 3) on the shaft 24 meshes with a gear 68 on a parallel shaft 69 connected through a reversing gearing 70 to a shaft 71. The gearing 70 comprises two gears 72 and 73 fixed on the shaft 69, a gear 74 on a back shaft 75 and meshing with the gear 73, a gear 76 rotatable on the shaft 71 and meshing with the gear 72 and formed with an internal gear clutch element 77 and a gear 78 axially splined on the shaft 71 and having a clutch element 79, the gear 78 being shiftable by means of a hand lever 80 selectively into mesh with the back gear 74 or into position to connect the clutch elements 77 and 79, or into neutral position.

The shaft 71 (see Figs. 6 and 7) is coupled to a shaft 81 connected through bevel gears 82 and 83 to a transverse shaft 84 journaled in the casing 9. Pick-off change gearing 85 consisting of four gears in a housing 86 on the front of the casing 9 connects the forward end of the shaft 84 to a parallel shaft 87. The gearing 85 permits a set-up adjustment for changing the rate of feed in relation to the spindle rotation to obtain different leads. To afford access to the gearing 85, a cover 88 is hinged on the front of the housing 86. Fixed on the shaft 87 is a worm 89 meshing with a worm wheel 90 on the screw 65.

The screw 65 is rotatably journaled in a fixed axial position in the casing 9, and extends parallel to and above the fed ram 7. One end of the screw 65 is anchored in an end plate 91 closing the outer end of the casing 9. The nut 66 preferably is a half nut mounted on the ram 7, and movable into and out of meshing engagement with the screw 65 at points intermediate the ends of the latter.

Preferably, the half nut 66 is mounted for vertical sliding movement in a hollow bracket 92 (see Figs. 6, 12, and 13) bolted to the top of the ram 7. Two spaced support bearings 93 and 94 for the screw 65 are provided in the bracket 92 at opposite sides of the nut 66. The bracket 92 is formed externally in the top and side walls with milled slots constituting a vertical guideway 95. Slidably mounted in the guideway 95 is a two-part yoke 96 having depending front and rear legs 97 disposed in the side wall slots. The half nut 66 is mounted between and rigidly connected to the lower ends of the legs 97.

To provide means for actuating the half nut 66, toggle links 98 and 99 are pivotally connected respectively to the bracket 92 and the rear yoke arm 97, and at their pivotal juncture are connected through a link 100 to a crank arm 101 splined for axial movement on a rock shaft 102 extending along the screw 55. One end of the shaft 102 is rotatably anchored in the end plate 91, and the other end is journaled in the casing 9 and connected through bevel gears 103 and 104 to a hollow stub shaft 105 journaled in a bearing sleeve 105ª. The shaft 105 slidably receives the shaft 58, and is provided with an end clutch element 106 adapted for engagement with a clutch element 107 on the hub of the arm 57

(see Figs. 9 and 10). When the lever 60 is in neutral position, the shaft 58 is shiftable rearwardly to connect the clutch elements 106 and 107. This movement is permitted by the slot portion 64. Thereupon, the shaft 58 may be rocked to effect movement of the half-nut 66 into and out of engagement with the screw 65. The rocking movement is permitted by a transverse slot portion 108 at the rear end of the slot portion 64. A spring pressed ball 109 in the sleeve 105ª is adapted for engagement with recesses 110 in the shaft 105 to retain the rotary parts yieldably in either position of adjustment. Similarly, a spring pressed ball 111 in the bracket 59 is adapted to engage selectively in two annular grooves 112 in the shaft 58 to define the two positions of axial adjustment.

It will be seen that when the shaft 58 is shifted rearwardly, the rod 55 and the arm 57 are disengaged and when the nut 66 is engaged with the screw 65, the pin 63 is located in the slot portion 108 to prevent forward shifting of the shaft. Likewise, when the pin 63 is in either end of the slot 61, the clutch 106—107 is open and the rod 55 and arm 57 are engaged and the shaft 58 is locked against rearward movement. Hence, the lever 60 constitutes a clutch actuator for both drives, and the slotted plate 62 and pin 63 provide an interlock preventing simultaneous connection of the drives.

The half nut 66 is subject to disengagement from the screw 65 at the extreme limits of travel of the ram 7. In the present instance, the means for this purpose comprises two inwardly projecting pins 113 and 114 mounted in longitudinally spaced relation in the rear wall of the casing 9, and disposed in the path of a beveled cam 115 on the heel of the crank arm 101. Engagement of the cam 115 with either of the pins 113 and 114 will actuate the toggle mechanism to drop the half nut 66.

Indicator means is provided for facilitating the connecting of the screw 65 and half nut 66 at desired points along the range of travel of the ram 7 so that the work threads may be picked up, for example, after a rapid return of the spindle 2 by means of the rack and pinion drive to original position. The indicator means comprises a dial 116 (see Figs. 12 and 15) mounted on a shaft 117 for rotation against the left face of a forwardly projecting portion of the end plate 91. Connecting the shaft 117 to a shaft 118 within a housing 119 on the end plate 91 is a train of gears 120, 121, and 122. The rotatably anchored shaft 118 extends along the screw 55, and is axially splined through a bevel gear 123 journaled in and movable with the nut bracket 92. A bevel gear 124, also journaled in the bracket 92, meshes with the gear 123, and is rigid with a worm wheel 125 meshing with the screw 55.

It will be seen that when the half nut 66 is engaged with the screw 65, the dial 116 will remain stationary since the drive of the gear 125 by the screw will be offset by the roll of the gear along the screw. However, when the half nut 66 is disengaged, the dial 116 will be rotated slowly in timed relation to the screw. The dial 116 is so geared to the precision screw 65 that it will be rotated one-eighth of a revolution, i. e., 45 degrees, for two revolutions of the screw and one inch of ram travel. Therefore, the dial 116 is graduated with eight divisions, identified by a numerical scale, and sixteen half divisions, which coact with a suitable indicia or mark on the end plate 91. As a result, if an even number of screw threads per inch are to be cut, engagement of the half nut 66 can be made on divisions of the dial 116 representing one-half inch of ram travel, i. e., on any of the sixteen half divisions. Likewise, if an odd number of screw threads per inch are to be cut, the engagement can be made on divisions representing one inch of ram travel or any of the eight dial divisions. If threads having half pitches, such for example as two and one-half threads per inch, are to be cut, engagement can be made only on divisions quartering the dial 116.

The screw 65 is driven continuously from the auxiliary spindle sleeve 11, and the connecting feed gear train is so designed that the relative position of rotation of the main spindle 2 and the screw is maintained at all times. Hence, by reason of the dial indicator 116 and the separable half nut connection, the spindle 2 can be advanced slowly to take an initial precision cut on the screw thread to be produced, then the nut 66 can be dropped to interrupt the drive, and subsequently the precision drive can be reestablished by reference to the dial 116 to pick up the thread for another cut. The reversing gearing 70 permits the cutting of right hand and left hand screw threads.

The spindle 2 is adjustable axially into different positions relative to the ram 7, and is therefore conveniently designated as a double set spindle. The ram 7 has a predetermined range of movement defined by the pins 113 and 114 when the precision screw drive is connected, and by yieldable end teeth on the rack 46, as disclosed in the patent to Gallimore No. 2,002,480 when the rack and gear drive is connected. A key 126 extends upwardly from the bottom wall of the casing 9 into a longitudinal spline groove 127 in the ram, and serves to hold the latter against rotation in any position of axial feed or adjustment. By advancing the spindle 2 and ram 7 as a unit in a cutting stroke, the spindle is capable of being projected from the headstock a distance equal to the maximum movement of the ram. If the spindle 2 now is released from the ram to permit return of the latter independently to initial position, and is then reconnected to the left end of the ram, the spindle and ram can again be fed as a unit to impart an additional feed to the spindle beyond the original range. Hence, the spindle has an axial range of movement equal approximately to twice that of the ram, and still a compact head construction is retained.

In the preferred form, the ram is formed with a bore 128 of uniform diameter opening entirely therethrough and partially closed at the outer end by a cover plate 129. A bearing housing or block 130 is slidably mounted in the bore 128 and is adapted to be secured in any desired position of adjustment therein by means of a clutch hereinafter described. The bearing housing 130 is held against rotation by a key 131 which engages in a longitudinal spline groove formed in and substantially coextensive in length with the bore 128. The right end of the spindle 2 is reduced in diameter, and extends through an axial bore 132 in the bearing housing 130. Radial and end thrust tapered anti-friction bearings 133 are mounted in opposite ends of the housing 130, and anchor and rotatably support the spindle 2.

Clutch means is provided for locking the housing 130 to the ram 7, and in the present instance comprises a longitudinal internal gear rack 134 formed in the ram and substantially coextensive in length with the bore 128, and a plunger pawl 135 having end teeth 135ª adapted for engagement with the rack. The pawl 135 is slidably mounted in a transverse guideway 136 formed in the housing 130 and intersecting one side of the bore 132, and is provided with an arcuate relief 137 in one side to provide clearance for the spindle 2. Formed in the side of the pawl 135 opposite the relief 137 is a spline groove 138 terminating in a shoulder 139 at the end adjacent the teeth 135ª. A key 140 projects from the housing 130 into the groove 138 to prevent the pawl 135 from rotating. A compression spring 141 is positioned in the groove 138 and in end abutting engagement with the shoulder 139 and the key 140, and tends to urge the pawl 135 toward the locking rack 134.

To provide means for actuating the pawl 135, a bell-crank lever 142 is pivotally mounted in a notch 143 formed in the housing 130 and opening to the guideway 136. One arm of the lever 142 extends transversely of the guideway 136, and engages at its end in a notch 144 in one side of the pawl 135. The other arm of the lever 142 extends from the notch 143 into a longitudinal spline groove 145 in a rock shaft 146. Preferably, the rock shaft 146 is rotatably housed in a longitudinal internal groove 147 formed in the ram 7 and substantially coextensive in length therewith, and is journaled at one end in the inner end of the ram and at the other end in the cover plate 129. A hand lever 148 is keyed to the outer end of the shaft 146, and at its free end carries a spring detent 149 adapted for selective engagement with two recesses 150 in the outer face of the cover plate 129 to hold the pawl 135 and actuating mechanism in one or the other position of adjustment.

It will be seen that the spindle 2 can be disconnected from the ram 7 by rocking the shaft 146 through the medium of the lever 148 to oscillate the lever 142 downwardly and thereby retract the pawl 135 from the rack 134. Reengagement between the rack 134 and the pawl 135 can be effected by rocking the shaft 146 in the opposite direction. A removable cover 151 normally closes an opening 152 in the casing end plate 91 through which access to the lever 148 may be had when desired.

The operation of the machine will be understood from the foregoing description, and briefly reviewed is as follows: For numerous kinds of work, such as drilling, milling and boring, the rack and gear drive for the ram 7 may be connected. This drive is reversible, and adapted for operation at any one of thirty-six different speeds relative to the spindle rotation. It is also adapted for use in rough cutting threads and in cutting threads and other parts having spiral surfaces where the accuracy of the lead is not important.

The rack and gear feed drive is not suitable for extreme precision work. Inaccurate or uneven spacing of the rack teeth or irregularity in form will result in a non-uniform lead. For work of this character, the precision feed drive is connected. The clutch interlock prevents the simultaneous connection of both drives. When taking repeated cuts on a thread, the precision drive may be used on the cutting stroke, and the rack and gear drive may be used to return the ram 7 in a rapid traverse to initial position. By reason of the dial 116, the precision drive can be connected to the ram 7 to pick up the thread being cut without necessitating the reversal of the machine. Since the rack and gear drive can be used exclusively for numerous cutting operations and for rapid return in precision operations, the precision drive need be used only where the character of the work requires, and hence is not subjected to unnecessary wear. Its accuracy is therefore maintained over a long period of life.

The double set spindle construction permits a long range of spindle feed for a given size of headstock. The first portion of the stroke is effected by a joint feed of the spindle 2 and the ram 7. The ram 7 may then be returned independently to initial position either by power or manually through the use of the master clutch 35. Then, the spindle 2 and the ram 7 may again be advanced jointly to effect the final portion of the stroke. When no feed is employed, the ram 7 is locked in position by a clamp 153 (see Fig. 11).

In general, the invention provides a high degree of flexibility in use, and yet is simple and compact in construction.

We claim as our invention:

1. A spindle headstock comprising, in combination, a non-rotatable axially reciprocable ram, a spindle journaled in said ram for axial movement therewith, a variable speed drive for rotating said spindle, a variable speed rack and pinion drive for traversing said ram, a variable speed nut and screw drive for traversing said ram, said two last mentioned drives being operable in parallel from the rotative drive, and means for connecting said parallel drives selectively to said ram.

2. A spindle headstock comprising, in combination, a casing, a non-rotatable ram axially reciprocable in said casing, a spindle journaled in said ram for axial movement therewith, a variable speed drive rotating said spindle, a reversible rack and pinion drive for traversing said ram, a reversible nut and screw drive for traversing said ram, and means for connecting said last two mentioned drives selectively to said ram.

3. A spindle headstock comprising, in combination, a casing, a non-rotatable ram axially reciprocable in said casing, a spindle journaled in said ram for axial movement therewith, drive means for rotating said spindle, and two selectively available independent power drive means for traversing said ram in timed relation to the spindle rotation.

4. A spindle headstock comprising, in combination, a casing, a non-rotatable ram axially reciprocable in said casing, a spindle journaled in said ram for axial movement therewith, drive means for rotating said spindle, a precision feed drive, and a variable-speed drive, said last two mentioned drives being operable from said first mentioned drive means and being adapted for independent connection selectively to said ram for traversing the latter in timed relation to the spindle rotation.

5. A spindle headstock comprising, in combination, a casing, a ram axially reciprocable in said casing, a spindle journaled in said ram for axial movement therewith and adapted to be projected from said casing, drive means for rotating said spindle, a precision feed drive for traversing said ram in timed relation to the spindle rotation and having a separable connection, a second independent drive for traversing said ram and having a separable connection, and means for closing one or the other of said connections selectively.

6. A spindle headstock comprising, in combination, a casing, a ram axially reciprocable in said casing, a spindle journaled in said ram for axial movement therewith, drive means for rotating said spindle, a nut and screw drive for traversing said ram in timed relation to the spindle rotation and including a separable connection, and a rack and pinion drive for traversing said ram and including a separable connection, and means for establishing one or the other of said last two mentioned drives through selective actuation of said connections.

7. A spindle headstock comprising, in combination, a non-rotatable axially reciprocable ram, a spindle journaled in said ram for axial movement therewith, means for rotating said spindle, a rack and pinion drive operable from said first mentioned means for traversing said ram, and including means for interrupting the connection to said ram and for reversing said connection to stop the traverse or effect a traverse in either direction, and a nut and screw drive parallel to said rack and pinion drive and including an axially stationary power screw and a nut mounted on said ram for movement therewith and movable into and out of engagement with said screw, and means for actuating said separable connection and said nut to establish one drive or the other.

8. A spindle headstock comprising, in combination, a casing, a main spindle and an auxiliary spindle rotatably mounted in parallel relation in said casing, a ram slidably mounted in said casing for moving said main spindle axially, a variable speed drive means for rotating said auxiliary spindle, a gear drive means including a separable connection between said spindles for rotating the main spindle, a variable-speed reversible rack and pinion drive operatively connected to said auxiliary spindle and adapted for connection to said ram to traverse the latter axially, a reversible screw and nut drive connected to said auxiliary spindle in parallel to said first mentioned drive and adapted for connection to said ram to traverse the latter axially in predetermined adjustable timed relation to the main spindle rotation, and means for completing one or the other of said drives selectively to said ram.

9. A spindle headstock comprising, in combination, a casing, a main spindle and an auxiliary spindle rotatably mounted in parallel relation in said casing, a ram slidably mounted in said casing for moving said main spindle axially, a variable speed drive means for rotating said auxiliary spindle, drive means between said spindles for rotating the main spindle, a reversible rack and pinion drive operatively connected to said auxiliary spindle and adapted for connection to said ram to traverse the latter axially, a screw and nut drive connected to said auxiliary spindle in parallel to said first mentioned drive and adapted for connection to said ram to traverse the latter axially in predetermined timed relation to the main spindle rotation, and means for connecting one or the other of said drives selectively to said ram.

10. A spindle headstock comprising, in combination, a casing, a feed ram slidably and non-rotatably mounted in said casing, a spindle journaled in said ram for movement therewith, means for rotating said spindle, and a drive for traversing said ram in timed relation to the spindle rotation, said drive including a power operable screw element rotatably anchored in said casing and extending longitudinally of said ram, and a nut element mounted on said ram for movement therewith and movable laterally into and out of threaded engagement with said screw element to establish or interrupt the drive connection.

11. A spindle headstock comprising, in combination, a casing, a feed ram mounted in said casing for longitudinal reciprocation, a spindle journaled in said ram for movement therewith, means for rotating said spindle, an elongated screw extending parallel to said ram and rotatably anchored in said casing, transmission means including a train of change gears and a direction reversing and stop mechanism for connecting said screw to said first mentioned means, a nut mounted on said ram for movement therewith and being movable transversely of said ram into and out of driving engagement with said screw, means for adjusting said nut into and out of engagement with said screw, and limit stops for actuating said last mentioned means automatically to disengage said nut from said screw at either extreme limit of ram movement.

12. A spindle headstock comprising, in combination, a casing, a feed ram mounted in said casing for longitudinal reciprocation, a spindle journaled in said ram for movement therewith, means for rotating said spindle, an elongated screw extending parallel to said ram and rotatably anchored in said casing, transmission means including a train of change gears and a direction reversing and stop mechanism for connecting said screw to said first mentioned means, a nut mounted on said ram for movement therewith and being movable transversely of said ram into and out of driving engagement with said screw, and means for adjusting said nut into and out of engagement with said screw.

13. A spindle headstock comprising, in combination, a casing, a feed ram mounted in said casing for longitudinal reciprocation, a spindle journaled in said ram for movement therewith, means for rotating said spindle, an elongated screw extending parallel to said ram and rotatably anchored in said casing, means including a separable connection for connecting said screw for a reversible drive to said first mentioned means, a nut mounted on said ram for movement therewith and being movable into and out of driving engagement with said screw, and means for adjusting said nut into and out of engagement with said screw.

14. A spindle headstock comprising, in combination, a casing, a feed ram mounted in said casing for longitudinal reciprocation, a spindle journaled in said ram for movement therewith, means for rotating said spindle, and a power feed drive for said ram including a screw extending parallel to said ram and rotatably anchored in said casing, a guide rigidly mounted on said ram for movement therewith, a half nut slidably confined on said guide for movement into and out of driving engagement with said screw, a rock shaft journaled in said casing and extending parallel to said screw, a toggle mechanism splined to said rock shaft and operatively connected to said half nut, and means for rocking said shaft to effect movement of said half nut into or out of engagement with said screw.

15. A spindle headstock comprising, in combination, a casing, a feed ram mounted in said casing for longitudinal reciprocation, a spindle journaled in said ram for movement therewith, means for rotating said spindle, and a power feed drive for said ram including a screw extending parallel to said ram and rotatably anchored in said casing, a guide rigidly mounted on said ram for movement therewith, a nut slidably confined in said guide for movement into and out of driving engagement with said screw, a rock shaft journaled in said casing and extending parallel to said screw, and means splined to said rock shaft and operable thereby to effect movement of said nut into or out of engagement with said screw.

16. A spindle headstock comprising, in combination, a casing, a feed ram mounted in said casing for longitudinal movement, a spindle journaled in said ram for movement therewith, means for rotating said spindle, and a power feed drive for said ram including a screw extending parallel to said ram and rotatably anchored in said casing, a guide rigidly mounted on said ram for movement therewith, a half nut slidably confined in said guide for movement into and out of driving engagement with said screw, a rock shaft journaled in said casing and extending parallel to said screw, a toggle mechanism splined to said rock shaft and operatively connected to said half nut, means for rocking said shaft to effect movement of said half nut into or out of engagement with said screw, and limit stops for actuating said toggle mechanism to drop said half nut out of engagement with said screw at predetermined points in the ram travel.

17. A spindle headstock comprising, in combination, a casing, a feed ram mounted in said casing for longitudinal movement, a spindle journalled in said ram for movement therewith, means for rotating said spindle, and a power feed drive for said ram including a screw extending parallel to said ram and rotatably anchored in said casing, a guide rigidly mounted on said ram for movement therewith, a nut slidably confined in said guide for movement into and out of driving engagement with said screw, a rock shaft journaled in said casing and extending parallel to said screw, means splined to said rock shaft and operable thereby to effect movement of said nut into or out of engagement with said screw, and limit means operable to drop said nut out of engagement with said screw at predetermined points in the ram travel.

18. A spindle headstock comprising, in combination, a casing, a feed ram slidably and non-rotatably mounted in said casing, a spindle journalled in said ram for movement therewith, means for rotating said spindle, two parallel drives adapted for connection selectively to said ram to reciprocate the latter and each including a separable connection, an actuator including a clutch for opening and closing the connection for one of said drives, an actuator including a clutch for opening and closing the other of said drives, a rock shaft axially movable in said casing to close one or the other of said clutches selectively and adapted to be rocked to open or close one or the other of said connections, and interlock means for preventing axial movement of said rock shaft when either of said connections is closed.

19. A spindle headstock comprising, in combination, a casing, a feed ram mounted in said casing for longitudinal movement, a spindle journaled in said ram for axial movement therewith, means for rotating said spindle, two parallel drives adapted for connection selectively to said ram to reciprocate the latter and each including a separable connection, an actuator including a clutch for opening and closing the connections for one of said drives, an actuator including a clutch for opening and closing the other of said drives, a rock shaft axially movable when in a neutral position to close one or the other of said clutches selectively and adapted to be rocked out of said neutral position to close one or the other of said connections, and interlock means for preventing axial movement of said rock shaft except when in said neutral position.

20. A spindle headstock comprising, in combination, a casing, a feed ram slidably and nonrotatably mounted in said casing, a spindle journaled in said ram for movement therewith, means for rotating said spindle, a drive including a feed screw extending parallel to said ram and rotatably anchored in said casing, a bracket connected rigidly to said ram for movement therewith, a nut adjustably confined on said bracket for movement into and out of driving engagement with said screw, a gear journaled in said bracket in mesh with said screw and adapted to roll along said screw upon axial movement of said ram, a dial rotatably mounted in a stationary position on said casing, and gear drive means connecting said dial to said gear for synchronous rotation.

21. A spindle headstock comprising, in combination, a casing, a ram slidably mounted in said casing, a spindle journaled in said ram for movement therewith, means for rotating said spindle, a drive for traversing said ram in timed relation to the spindle rotation and including a feed screw extending parallel to said ram and rotatably anchored in said casing, a bracket connected rigidly to said ram for movement therewith, a nut adjustably confined on said bracket for movement into and out of driving engagement with said screw, a gear journaled in said bracket in mesh with said screw and adapted to roll along said screw upon axial movement of said ram, and an indicator connected to said gear for adjustment in timed relation to the rotation of said gear.

22. A spindle headstock comprising, in combination, a casing, a feed ram slidably and nonrotatably mounted in said casing, a spindle journaled in said ram for movement therewith, means for rotating said spindle, drive means including a screw extending parallel to said ram and rotatably journaled in said casing, a bracket mounted on said ram, a nut mounted in said bracket for movement with said ram and for adjustment into and out of driving engagement with said screw, and means for indicating the position of rotation of said screw relative to said nut.

23. A spindle headstock comprising, in combination, a casing, a hollow tubular ram mounted for sliding movement in said casing, and formed internally with a longitudinal series of rack teeth, a block slidable longitudinally in said ram, a spindle extending through said ram and journaled in said block, a clutch member mounted in said block for adjustment into and out of engagement with said rack teeth, and means available at will for adjusting said clutch member.

24. A spindle headstock comprising, in combination, a casing, a hollow ram mounted for sliding movement in said casing, a block slidable longitudinally in said ram, a spindle extending through said ram and journaled in said block, clutch means for connecting said block to said ram in different selective positions of relative longitudinal adjustment, and means available at will and extending externally of said ram for adjusting said clutch means.

KEITH F. GALLIMORE.
GARNER H. SCHURGER.